(12) United States Patent
Michaud et al.

(10) Patent No.: US 8,109,854 B2
(45) Date of Patent: Feb. 7, 2012

(54) SUPERFINISHING LARGE PLANETARY GEAR SYSTEMS

(75) Inventors: Mark Michaud, Austin, TX (US); Edward David Summers, Kempen (DE)

(73) Assignees: REM Technologies, Inc., Southington, CT (US); OSRO GmbH, Krefeld (DE)

( * ) Notice: Subject to any disclaimer, the term of this patent is extended or adjusted under 35 U.S.C. 154(b) by 1129 days.

(21) Appl. No.: 10/856,534

(22) Filed: May 28, 2004

(65) Prior Publication Data

US 2005/0014597 A1 Jan. 20, 2005

Related U.S. Application Data

(60) Provisional application No. 60/474,836, filed on May 30, 2003, provisional application No. 60/475,210, filed on Jun. 2, 2003.

(51) Int. Cl.
*F16H 57/08* (2006.01)
*B44C 1/22* (2006.01)
*S21D 53/28* (2006.01)

(52) U.S. Cl. ......... 475/344; 475/331; 216/52; 29/893.3

(58) Field of Classification Search ............... 475/331, 475/344; 451/47, 104, 113; 216/52, 53, 216/96

See application file for complete search history.

(56) References Cited

U.S. PATENT DOCUMENTS

| | | | | |
|---|---|---|---|---|
| 4,307,544 A | * | 12/1981 | Balz | 451/113 |
| 4,491,500 A | | 1/1985 | Michaud et al. | 156/628 |
| 4,818,333 A | | 4/1989 | Michaud | |
| 4,920,703 A | * | 5/1990 | Hosoya | 451/47 |
| 5,503,481 A | | 4/1996 | Hashimoto et al. | 384/569 |
| 5,685,797 A | * | 11/1997 | Barnsby et al. | 475/331 |
| 5,967,672 A | | 10/1999 | Akamatsu et al. | 384/516 |
| 6,280,295 B1 | * | 8/2001 | Wu | 451/113 |
| 6,346,784 B1 | * | 2/2002 | Lin | 318/9 |
| 6,420,808 B1 | | 7/2002 | Hosle | 310/83 |
| 6,478,933 B1 | | 11/2002 | Dam et al. | 204/192.3 |
| 6,544,110 B2 | * | 4/2003 | Gilmore et al. | 451/113 |
| 6,672,023 B2 | * | 1/2004 | Henderson | 52/296 |

(Continued)

FOREIGN PATENT DOCUMENTS

AU 697351 B2 10/1998

(Continued)

OTHER PUBLICATIONS

Aerospace/Airline Plating and Metal Finishing Forum, Annual Forum and Exposition, Mar. 27-29, 2001; pp. 1-140.

(Continued)

*Primary Examiner* — Roger Pang
(74) *Attorney, Agent, or Firm* — Winston & Strawn LLP

(57) ABSTRACT

Disclosed herein is a new improved large planetary gear system used on the input stage of wind turbine power generators. This improved planetary gear system reduces or eliminates lubricant debris traditionally generated from the gear teeth, thereby eliminating an initiating source for bearing failure. To achieve these results, some and preferably all of the gear teeth within the planetary gear system are superfinished using chemically accelerated vibratory finishing to a surface roughness of approximately 0.25 micron or less. Several objects and advantages of the invention are to provide a gearbox with reduced metal debris, improved bearing life, reduced wear, reduced vibro-frictional noise, improved contact fatigue, improved fretting resistance, improved lubrication, to simplify the run-in process, and to enhance the durability and efficiency of the gearbox.

28 Claims, 7 Drawing Sheets

| | | Dimension (cm) |
|---|---|---|
| A | Outer Diameter of Hollow Wheel Gear | 169 |
| B | Inner Diameter of Hollow Wheel Gear | 146 |
| C | Face Width of Gear | 39 |
| D | Distance from Top of Gear to Top of Channel | 21 |
| E | Approximate distance from Bottom of Gear to Bottom of Channel | 5 |

U.S. PATENT DOCUMENTS

| | | | |
|---|---|---|---|
| 6,732,606 B1 | 5/2004 | Zhu et al. ................... | 74/460 |
| 6,846,261 B2 * | 1/2005 | Lev et al. ................... | 475/344 |
| 7,011,598 B2 * | 3/2006 | Flamang et al. ............ | 475/331 |
| 2002/0088773 A1 * | 7/2002 | Holland et al. ............. | 216/88 |
| 2003/0040264 A1 * | 2/2003 | Taniguchi et al. .......... | 451/47 |
| 2003/0106617 A1 | 6/2003 | Black et al. ................. | 148/219 |
| 2005/0164610 A1 * | 7/2005 | Michaud et al. ............ | 451/47 |

FOREIGN PATENT DOCUMENTS

| | | | | |
|---|---|---|---|---|
| EP | 0294245 A1 | 12/1988 | | |
| EP | 0414441 A2 | 2/1991 | | |
| EP | 0 635 639 A1 | 1/1995 | | |
| EP | 0635639 | 1/1995 | | |
| EP | 0995530 A2 | 4/2000 | | |
| EP | 1167825 | 1/2002 | | |
| EP | 1167825 A2 | 1/2002 | | |
| EP | 1350601 A1 | 10/2003 | | |
| EP | 2311605 | 4/2011 | | |
| GB | 1304451 | 1/1973 | | |
| JP | 401058463 A * | 3/1989 | ................. | 451/113 |
| JP | 06-246548 A | 9/1994 | | |
| JP | 63-229262 A | 9/1998 | | |
| JP | 11-048036 A | 2/1999 | | |
| JP | 2000257697 A | 9/2000 | | |
| JP | 2002-070988 A | 3/2002 | | |
| SU | 95704 | 4/1951 | | |
| SU | 95704 | 9/1958 | | |
| SU | 1065162 | 1/1984 | | |
| SU | 1535703 | 1/1990 | | |
| WO | WO 02/055263 | 7/2002 | | |
| WO | WO 02/055263 A2 | 7/2002 | | |
| WO | WO 02/062528 | 8/2002 | | |

OTHER PUBLICATIONS

Arvin, et al "The Effect of Chemically Accelerated Vibratory Finishing on Gear Metrology", American Gear Manufacturers Association, Technical Paper, Oct. 2002, pp. 1-16.

Houser, et al "Vibro-Acoustic Effects of Friction in Gears: an Experimental Investigation", Society of Automotive Engineers, Inc., 2001.

Michaud, et al "Chemically Accelerated Vibratory Finishing for the Elimination of Wear and Pitting of Alloy Steel Gears", American Gear Manufacturers Association, Technical Paper, Oct. 2001, pp. 1-14.

Nebiolo, William P., "Horsepower Retention by ISF (Isotropic Superfinishing) of Automotive Racing Components", REM Technologies, 04msec 79, pp. 1-12.

Winkelmann, et al "Effect of Superfinishing on Scuffing Resistance" ASME, Sep. 2003, DETC2003-48124, pp. 1-6.

Winkelmann, et al "Impact of Isotropic Superfinishing on Contact and Bending Fatigue of Carburized Steel" Society of Automotive Engineers, SAE International, Mar. 2002, 2002-01-1391, pp. 1-13.

Winkelmann, et al "Superfinishing Motor Vehicle Ring and Pinion Gears" American Gear Manufacturers Association Technical Paper, Oct. 2004, 04FTM13, pp. 1-14.

Zhou, et al "A New Rolling Contact Surface and "No Run-In" Performance Bearings", Journal of Tribology, Dec. 1994, 94-Trib-28, pp. 1-5.

ANSI/AGMA 2001-C95, "Fundamental Rating Factors and Calculation Methods for Involute Spur and Helical Gear Teeth," Jan. 12, 1995.

Danish Energy Agency, "Recommendations to Comply with the Requirements in the Technical Criteria for the Danish Approval Scheme for Wind Turbines—Gearboxes—Section 5—Lubrication," Feb. 2002.

AGMA/AWEA 921-A97, "Recommended Practices for Design and Specification of Gearboxes for Wind Turbine Generator Systems," approved Oct. 28, 1996.

ANSI/AGMA/AWEA 6006-A03, "Standard for Design and Specification of Gearboxes for Wind Turbines," approved Jan. 9, 2004.

Darle W. Dudley, "Handbook of Practical Gear Design," Section 2.4, 1994.

Official Action issued Feb. 11, 2008 in RU Appl # 2005141558/02 (046289) (English Translation).

Written Opinion of the International Preliminary Examining Authority, date May 16, 2007, for PCT Application No. PCT/US04/17079.

Schuetz, Georger, Quality Gaging Tips Surface Texture from Ra to Rz, http://www.mmsonline.com/articles, Apr. 2006, pp. 1-2.

Christensen, Mortan Stender, "Real Time Gearbox Oil Analysis as a Condition Monitoring Technique of Offshore Wind Turbines", at 1, CREST Loughborough University, 2001.

ANSI/AGMA 2001-D04, "Fundamental Rating Factors and Calculation Methods for Involute Spur and Helical Gear Teeth," Dec. 28, 2004.

Errichello, Robert, "Friction, Lubrication, and Wear of Gears", ASM Handbook, vol. 18, Friction and Lubrication Technology at 541, 1992.

Joachim, Franz et al, "Influence of Coatings and Surface Improvements on the Lifetime of Gears", Gear Technology, at 50-51, Jul./Aug. 2004.

Franke, Jan-Bernd et al, "Lifetime Prediction of Gear Teeth Regarding to Micropitting in Consideration of WEC Operation States", presented at DEWEK 2004, Oct. 21, 2004.

Bartz, Dr.-Ing Willfried J., et al, "Gear Lubricants as Design Elements", TRIBO Journal, Kluber Lubrication, Jan. 2006.

Whitehouse, David J., "Surface Geometry and its Importance in Function", Handbook of Surface Metrology, Chapter 7, 1994.

Mummery, Leigh, "Surface Texture Analysis, the Handbook", Chapter 3, 1992.

McNiff, Brian et al, "Documenting the Progress of Gear Micropitting in the NREL Dynometer Test Facility", AWEA 2002, Jun. 3, 2002.

Hohn, Prof. Dr.-Ing. Bernd-Robert et al, "Surface Micro Geometry and Gear Performance", Accurate Gear Metrology, PTB Braunschweig, Sep. 24, 2004.

Errichello, Robert, "Selecting and Applying Lubricants to Avoid Micropitting of Gear Teeth", Geartech, Machinery Lubrication Magazine, Nov. 2002.

Akamatsu, Yoshinoub, "Improvement of Rolling Bearing Fatigue Life by Reforming the Surface Roughness Pattern", Japanese Journal of Triboloy, vol. 37, No. 7, 1992.

Tanaka, S. et al, "Appreciable Increases in Surface Durability of Gear Pairs with Mirror-Like Finish", Gear Technology, Mar./Apr. 1987.

European Search Report of European Patent Application EP 10 18 4217 dated Mar. 21, 2011.

Metal Improvement Company's LLC Response to Opposition filed against EP 1646477 on Aug. 17, 2011.

Office Action in corresponding Canadian App. No. 5,527,311, dated Aug. 27, 2008.

Decision on Grant (incl. translation) in corresponding Russian App. No. 2005141558, dated Apr. 1, 2009.

Heavy Gear-Cutting Machine Ltd (cited on Mar. 27, 2007), internet http://www.zaotzs.ru/?item=page&name=day (in Russian).

Office Action (incl. translation) in corresponding Japanese App. No. 2006-533520, dated Mar. 31, 2009.

Translation of Office Action in corresponding Japanese App. No. 2006-533520, dated Apr. 13, 2010.

Response to Oppositions filed against EP Patent 1646477 as filed Nov. 15, 2010, 16 pgs.

Extract from Wikipedia in relation to "surface roughness", 4 pgs.

Opposition to EP 1646477, filed by PIV Drives GmbH (Jan. 27, 2010).

Translation (uncertified) of Opposition to EP 1646477, filed by PIV Drives GmbH.

Exhibit E1 to Opposition to EP 1646477, filed by PIV Drives GmbH (excerpts from AGMA/AWEA 921-A97, "Recommended Practices for Design and Specification of Gearboxes for Wind Turbine Generator Systems" (undated)).

Exhibit E2 to Opposition to EP 1646477, filed by PIV Drives GmbH (EP 1167825 A2, publication date Jan. 2, 2002).

Exhibit E3 to Opposition to EP 1646477, filed by PIV Drives GmbH (Krantz, T.L., et al., "Surface Fatigue Lives of Case-Carburized Gears with an Improved Surface Finish," NASA/TM-2000-210044 (Apr. 2000)).

Exhibit 4 to Opposition to EP 1646477, filed by PIV Drives GmbH (Niskanen, Paul, et al., "Reducing Wear with Superfinish Technology," AMPTIAC Quarterly, vol. 7, No. 1 (2003)).

Exhibit 5 to Opposition to EP 1646477, filed by PIV Drives GmbH (excerpts from ANSI/AGMA/AWEA 6006-A03, "Standard for Design and Specification of Gearboxes for Wind Turbines," (2003)).
Opposition to EP 1646477, filed by Metal Improvement Company, LLC (Dec. 16, 2009).
Exhibit D1 to EP 1646477, filed by Metal Improvement Company, LLC (AGMA/AWEA 921A97, "Recommended Practices for Design and Specification of Gearboxes for Wind Turbine Generator Systems" (1997)).
Exhibit D2 to EP 1646477, filed by Metal Improvement Company, LLC (EP 1167825 A2, publication date Jan. 2, 2002).
Exhibit D3 to EP 1646477, filed by Metal Improvement Company, LLC (O'Hara, Peter, "Surface Optimisation by Engineering the Stress and Roughness," ASME 96-GT-451 (1996)).
Exhibit D4 to EP 1646477, filed by Metal Improvement Company, LLC (EP 1350601 A2, publication date Oct. 8, 2003).
Exhibit D5 to EP 1646477, filed by Metal Improvement Company, LLC (U.S. Patent No. 6,420,808 B1, issued Jul. 16, 2002).
Opposition to EP 1646477, filed by Eickhoff Antriebstechnik GmbH (Jan. 30, 2010).
Translation (uncertified) of Opposition to EP 1646477, filed by Eickhoff Antriebstechnik GmbH.
Exhibit A1 to Opposition to EP 1646477, filed by Eickhoff Antriebstechnik GmbH (Minutes of the visit by Repower, dated Feb. 11, 2003).
Translation (uncertified) of Exhibit A1 to Opposition to EP 1646477, filed by Eickhoff Antriebstechnik GmbH.
Exhibit A2 to Opposition to EP 1646477, filed by Eickhoff Antriebstechnik GmbH (printout from http://www.walther-trowal.de/profil.html, dated Apr. 15, 2003 (in German)).
Exhibit A3 to Opposition to EP 1646477, filed by Eickhoff Antriebstechnik GmbH (Minutes of the visit by Schnarrenberger, dated Apr. 24, 2003).
Translation (uncertified) of Exhibit A3 to Opposition to EP 1646477, filed by Eickhoff Antriebstechnik GmbH.
Exhibit A4 to Opposition to EP 1646477, filed by Eickhoff Antriebstechnik GmbH (correspondence from Schnarrenberger to Eickhoff, dated Apr. 24, 2003).
Translation (uncertified) of Exhibit A4 to Opposition to EP 1646477, filed by Eickhoff Antriebstechnik GmbH.
Exhibit A5 to Opposition to EP 1646477, filed by Eickhoff Antriebstechnik GmbH (EP 1350601 A1, publication date Oct. 8, 2003 (in German)).
Exhibit A6 to Opposition to EP 1646477, filed by Eickhoff Antriebstechnik GmbH (Niskanen, Paul, et al., "Reducing Wear with Superfinish Technology," AMPTIAC Quarterly, vol. 7, No. 1 (2003)).
Exhibit A7 to Opposition to EP 1646477, filed by Eickhoff Antriebstechnik GmbH (U.S. Patent No. 5,873,770, issued Feb. 23, 1999).
Opposition to EP 1646477, filed by N.N. veiled opposer (Jan. 14, 2010).
Translation (uncertified) of Opposition to EP 1646477, filed by N.N. veiled opposer.
Analysis to Opposition to EP 1646477, filed by N.N. veiled opposer.
Exhibit D1 to Opposition to EP 1646477, filed by N.N. veiled opposer (AMGMA 02FTM1, The Effect of Chemically Accelerated Vibratory Finishing on Gear Metrology (2002)).
Exhibit D4 to Opposition to EP 1646477, filed by N.N. veiled opposer (Krantz, T.L., et al., "Surface Fatigue Lives of Case-Carburized Gears with an Improved Surface Finish," NASA/TM-2000-210044 (Apr. 2000)).
Exhibit D5 to Opposition to EP 1646477, filed by N.N. veiled opposer (Snidle, R.W. et al., "The Effect of Superfinishing on Gear Tooth Profile," Univ. of Wales Cardiff School of Engineering, Report No. 2284 (Jun. 1997)).
Exhibit D6 to Opposition to EP 1646477, filed by N.N. veiled opposer (Niskanen, Paul, et al., "Reducing Wear with Superfinish Technology," AMPTIAC Quarterly, vol. 7, No. 1 (2003)).
Extended European Search Report dated Sep. 2, 2009; Application No./Patent No. 09155489.9-2302.
Extended European Search Report dated Sep. 3, 2009; Application No./Patent No. 09155491.5-2302.

* cited by examiner

|   |   | Dimension (cm) |
|---|---|---|
| A | Outer Diameter of Vibratory Bowl | 201 |
| B | Inner Diameter of Vibratory Bowl | 188 |
| C | Channel Width | 62 |
| D | Channel Depth | 65 |
| E | Total Height of Vibratory Bowl | 148 |
| F | Processing Channel |   |
| G | 7.5 kW Motor |   |
| H | Adjustable Weight Arms |   |
| I | Drain |   |
| J | Media Discharge Door |   |
| K | Spring |   |

| | | Dimension (cm) |
|---|---|---|
| A | Outer Diameter of Hollow Wheel Gear | 169 |
| B | Inner Diameter of Hollow Wheel Gear | 146 |
| C | Face Width of Gear | 39 |
| D | Distance from Top of Gear to Top of Channel | 21 |
| E | Approximate distance from Bottom of Gear to Bottom of Channel | 5 |

SUPERFINISHING LARGE PLANETARY GEAR SYSTEMS

This application claims the filing date benefit of U.S. Provisional Application No. 60/474,836, filed May 30, 2003, and also claims the filing date benefit of U.S. Provisional Application No. 60/475,210, filed Jun. 2, 2003.

BACKGROUND OF THE INVENTION

This invention relates to a new improved input planetary stage for a large gear box. The input planetary stage cited in this invention is for a wind turbine power generator having an output power capacity rating of 500 kW and greater.

Wind turbine power generators are considered one of the most cost effective and environmentally friendly methods of generating electricity. Individual wind turbines are currently being designed and built for electrical power generation in excess of 5 MW. A key component of most wind turbines are their gearboxes, which are subjected to varying high loading at low speeds, and have design lifetimes of 20 years. Anything that will give these gearboxes more durability and efficiency is highly coveted by wind turbine manufacturers and operators.

Modern large wind turbine generators (500 kW and greater) are massive devices commonly using large planetary gear systems as the input stage. These heavy gearboxes, which are mounted atop high towers, often located in remote locations such as on a mountain or offshore, experience severe fluctuations in wind conditions and temperature and are often exposed to a corrosive seawater environment and/or abrasive particulates. A gearbox failure can require removing the gearbox using mammoth equipment, and rebuilding it back at the manufacturer's facility followed by reinstallation at the remote location. The concurrent loss of electrical generation is also a costly event unto itself.

Manufacturers recognize that removing the peak asperities from the contact surfaces of gear teeth prior to full field operation increases the service life of the gearbox. There are two obvious advantages to removing peak asperities. Firstly, this will reduce the amount of metal-to-metal contact which produces lubricant debris and which is known to be destructive to gears and bearings. Secondly, it improves the material ratio ($R_{mr}$), which is a measure of the amount of gear tooth surface available for supporting the load. The industry assumed that any technique to remove the peak asperities was equivalent as long as no obvious metallurgical damage or no significant alteration to the lead and profile geometry occurred. Gear honing, for example, is often used in the aerospace industry to reduce peak asperity heights. Honing could have been a consideration for wind turbine gearboxes; except that it is cost prohibitive on such large gears as most honing equipment is limited to processing gears having a diameter of 12 inches or less. As such, today's wind turbine gears typically have ground teeth flanks and are recommended to be operated through a run-in procedure to remove the peak asperities from the contact surfaces.

It has been taught for a number of years that optimum performance benefits for bearings are achieved when the mating contacting surfaces are both isotropically superfinished to an arithmetic average roughness ($R_a$) of less than approximately 0.075 micron using chemically accelerated vibratory finishing. Similarly, gears in auto racing transmissions, which operate under high loads with high pitch line velocities, have benefited from this isotropic superfinishing process with teeth finishes of $R_a$ from 0.3 micron to less than 0.025 micron. Such superfinished gears experience reduced contact fatigue, operating temperature, friction, noise and vibration.

Superfinishing enables the development of hydrodynamic lubrication (HL) or elastohydrodynamic lubrication (EHL). HL exists when there is complete separation of the mating gear teeth during operation achieved by a continuous lubricant film. EHL exists in highly loaded mated gear teeth under operation when the separating fluid film formation is influenced by elastic deformation of the contacting surfaces. Hence, with HL or EHL during their high speed and high load operation, superfinished auto racing transmissions experience almost no metal-to-metal contact of the mating teeth.

In sharp contrast to auto racing transmissions, the input planetary stage gears used in the wind turbine power generating industry operate under significantly different conditions. In wind turbine applications, the gears experience very high, varying loads at low pitch line velocities such that boundary lubrication rather than hydrodynamic (HL) or elastohydrodynamic lubrication (EHL) is predicted. Boundary lubrication exists when the mating gear teeth during operation are wetted with fluid but the lubricant film thickness is less than the combined mating surface roughness. Thus, the lubricant film can be penetrated by peak asperities, and metal-to-metal contact generates metal debris from the gear teeth. Traditionally manufactured ground wind turbine gear teeth (see "Standard for Design and Specification of Gear Boxes for Wind Turbines," ANSI/AGMA/AWEA 6006-A03) after the run-in process described below, are hoped to achieve a surface finish of $R_a$=0.5-0.7 micron. However, those practiced in the art recognize that a traditionally manufactured hollow wheel will have a much higher surface finish. It is recommended by the AGMA standard that this gear's finish not exceed $R_a$>1.6 micron. Finishes of 0.5-0.7 micron are considered sufficient to avoid most metal to metal flank contact. It was also believed that this surface condition would result in significant lubricant retention needed with the slow moving gear teeth and thus the best possible lubrication condition would be achieved. However, a major source of wind turbine gear box failure is failure of the bearings. Even with run-in achieving the above finishes, metal to metal teeth contact continues on the planetary gear stage teeth and produces lubricant debris, which in turn contributes to the rapid bearing failures.

In contrast, chemically accelerated vibratory superfinishing to a condition of Ra<0.3 micron was thought to be too smooth for large wind turbine generators in that the teeth flanks would have insufficient lubricant retention for operation and tooth failure was predicted. Thus, it was questionable whether or not superfinishing using chemically accelerated vibratory finishing of the input planetary stage would add any performance value to the gear box. Only lengthy and costly field testing could provide the answer.

In addition, it was thought by those skilled-in-the-art that the large, heavy gears that make up an input planetary stage of a large wind turbine generator could not be processed in vibratory finishing equipment used in the chemically accelerated vibratory finishing process. This vibratory finishing equipment is either in a bowl or tub form. The input planetary stage gears are typically 200 kg or more for generators of an output capacity of 500 kW and larger. This gear weight was thought to be beyond the normal range of operation for vibratory finishing equipment.

In particular, it was thought that a large hollow wheel gear (annulus gear) weighing from 400 kg to greater than 5000 kg could not be superfinished in a large vibratory bowl. A person skilled-in-the-art would have predicted that such a massive gear with its relatively small cross sectional area would have immediately sunk to the bottom of the bowl damaging the lining, the gear or both. In addition, the heavy gear would have been expected to fracture significant quantities of the ceramic media used in the vibratory finishing equipment because of the high pressure exerted upon the media. The shards produced by the crushing of the ceramic media would have sharp points and edges. Instead of smoothing the critical contact surfaces of the gear teeth to a superfinished condition, these media fragments would have been predicted to damage these surfaces resulting in roughened, gouged and even denting the surfaces, especially nearer the bottom of the bowl where the pressure is greatest. The damage would have been significantly augmented for softer through-hardened (32-40 HRC) hollow wheel gears. The anticipated high rate of media attrition from fracturing would also add an unacceptable processing cost as well as causing the problem of clogging and blocking the drains of the processing machine.

Additionally, in processing the hollow wheel, it would have been expected that there would have been a variance in the intensity of media pressure across the lead of the gear teeth. The pressure of the media on the gear teeth nearer the bottom of the bowl is greater than the pressure of the media near the top. As a result, more stock would be expected to be removed from the gear teeth nearer the bottom than nearer the top. Therefore, the vibratory processed hollow wheel gear could end up being out of dimensional tolerance. This could be partially mitigated by removing the gear half way through the process, turning it over, returning it to the bowl, and continuing the process. It should be mentioned though that turning such a large gear is time consuming and potentially dangerous. Also, part of the center width of the gear teeth would be processed for twice the finishing time, possibly causing a resultant change in the tooth geometry. Each of the above predicted shortcomings would have been predicted to make this superfinishing process for large hollow wheel gears commercially impractical and unpredictable.

Similar shortcomings would have been expected for the chemically accelerated vibratory finishing of the other gears that make up the input planetary stage of a wind turbine gear box. These gears, known as planets and sun pinions, are similarly massive, typically weighing in excess of 200 kg each. As such, those skilled-in-the-art would have predicted they could not be processed in vibratory finishing equipment, whether bowls or tubs. Therefore, the wind turbine industry could not realize the benefits of this superfinishing process for the input planetary stage of the gear box.

It should be noted that it is desirous to be able to use through-hardened hollow wheel gears instead of gas nitrided or gas carburized hollow wheels in the large input planetary gear stage. Through-hardened hollow wheels are less costly to manufacture.

Gas nitriding is expensive, time consuming, and produces a very hard, brittle "white layer" on the teeth surfaces. Those practiced in the art recognize this white layer must be removed prior to use of the gear. However, removal of the white layer by grinding is at great expense and risk to ruining the hollow wheel. Alternative removal of the white layer by chemical dissolution is a very hazardous and environmentally unfriendly process.

In gas carburizing, due to the significant distortion from the heat treatment process, final grinding of the teeth is required, which is also an expensive process. Furthermore, after final grinding, the gas carburized hollow wheel requires temper burn inspection, another hazardous and environmentally unfriendly process.

Additionally, through-hardened hollow wheels are not just less expensive to manufacture, they can also be more geometrically accurate when compared to nitrided or carburized hollow wheels. This is very beneficial in that the remaining gears of the planetary gear set are routinely manufactured to high geometrical accuracy. Thus, if a more accurate, less expensive through-hardened hollow wheel can be operated with high accuracy planet and sun gears, the resulting planetary gear set could be highly efficient and of sufficient durability. If the through-hardened hollow wheel could be superfinished using chemically accelerated vibratory finishing, its teeth would be of sufficient surface capacity and capable of operating in HL or EHL regimes, thereby reducing debris generation. Thus, if superfinished through-hardened hollow wheels combined with superfinished planets and sun gears can operate satisfactorily at wind turbine designed loads and speeds, the result would be a superior input planetary gear stage. Alternatively, if the planets and sun pinion gears could be superfinished and mated to a non-superfinished hollow wheel, irrespective of its metallurgical heat treatment, the result would be an improved input planetary gear stage for a wind turbine generator of output capacity of 500 kW and greater. Therefore, superfinishing some, or preferably all, of the gears in the input planetary stage will result in a reduction or elimination of lubricant debris generated from the gear teeth, thereby reducing or eliminating a source of damage to the bearings.

In point of fact, gearbox manufacturers for large wind turbine power generators had only one viable choice for reducing peak asperities after grinding, and that was the run-in process. In the run-in process, the gears are smoothed in the assembled state by operating the gears box under various loads and speeds such that the contact area peak asperities shear away or plastic deform themselves. It should be mentioned that this was also the most economical route to take as the gearbox has to be tested and certified under load conditions anyway prior to its shipment and installation at its final destination. The run-in and testing phase can be conducted simultaneously on the same test rig. The AGMA/AWEA & The Danish Energy Agency, for example, have written guidelines for designing wind turbine gearboxes and stress the need for run-in. The impact of surface finish on gear tooth durability is briefly discussed, but the methodology of smoothing the surface is given no consideration. This view, that the method of removing the peak asperities is irrelevant, is generally shared by this industry as well as other gear manufacturers.

An ideal run-in process requires operation of the gearbox at different loads and speeds to simulate actual field conditions in order to smooth the asperity peaks across the whole load-carrying surface. However, duplicating actual service conditions on a test rig is not only virtually impossible, but is also impractical as well due to equipment, time and cost constraints. During the run-in process, the oil film thickness is often purposefully reduced to allow more asperity peak contact thereby resulting in a smoother surface. Once the run-in process is completed, the gearbox run-in lubricant and filtration system should be serviced. Typically the lubricant is drained, the gearbox flushed, and replaced with fresh lubricant, and the filter, which captures metal debris generated during the run-in process, is cleaned or replaced. Unfortunately, even during run-in, this metal debris can initiate serious damage to the bearings and gear contact surfaces before collection in a filter. And, most filters are capable of capturing only the largest debris particles and allow passage of the finer particles. These fine particles still are capable of causing surface damage, particularly to the gear box bearings.

Also, no matter how thoroughly or carefully the run-in procedure is conducted, this process leaves microscopic material distress (stress raisers) on the gear teeth contact regions due to the high stresses created to mechanically shear, fracture or elastically deform the peak asperities. These stress raisers act as initiation sites for future contact fatigue failures or micropitting.

Consequently, even after run-in, the input planetary gears often experience micropitting during the early period of field service. Micropitting by itself is another source of metal debris which can cause further damage to the bearings and gear contact surfaces since the metal debris is not immediately or completely trapped by the filtration system. It should be stressed that even microscopic metal debris particles, which can pass through a 10-micron filter, are still large enough to initiate damage. Micropitting is acknowledged to be an indicator of possible future gear failure and/or serious wear problems. Whenever severe wear occurs, the gear tooth profile is changed leading to increased vibration and noise which places an elevated stress on the gear box system.

Additionally, run-in procedures typically only smooth the drive side of the hollow wheel and sun gear while leaving the coast sides of these gear teeth as machined. During adverse operating conditions such as strong gusts of wind or turbine braking, coast side loading can be high enough to produce asperity contact and contribute to harmful metal debris. However, chemically accelerated vibratory superfinished gears are smoothed on both sides of the contact teeth surfaces.

Again, it needs to be emphasized that the industry has failed to give guidance on the actual optimum surface finish, or on the method of generating such optimum surfaces to improve gearbox durability. Instead it has relied mainly on run-in procedures to smooth the gear teeth contact areas to what was believed to be a satisfactory condition.

SUMMARY OF THE INVENTION

Disclosed herein is an improved large planetary gear system used on the input stage of wind turbine power generators. This improved planetary gear system reduces or eliminates lubricant debris traditionally generated from the gear teeth, thereby eliminating an initiating source for bearing failure. To achieve these results, some and preferably all of the gear teeth within the planetary gear system are superfinished using chemically accelerated vibratory finishing to a surface roughness of approximately 0.25 micron or less.

In particular, a novel method is disclosed for superfinishing the massive hollow wheel gear, especially a through-hardened hollow wheel gear, placed horizontally in a vibratory bowl.

It will be appreciated that the inventive teachings disclosed herein are useful to all other applications of large planetary gear sets. Similarly, the teachings of this invention are applicable to some or all the gears of other large, non-planetary, gear box types where boundary lubrication regimes exist due to traditionally ground teeth finishes. The style of gears within these gear boxes, such as spur, helical, face, bevel and the like, are not important to the inventive concept disclosed herein.

It will be readily apparent to those skilled in this art that various modifications and changes of an obvious nature may be made, and all such modifications and changes are considered to fall within the scope of the claims. Other embodiments of the invention will be apparent to those skilled in the art from consideration of the specification and practice of the invention disclosed herein. Examples are superfinishing all the gears, and/or all the bearings within these types of large gear boxes. Hence, the specific embodiments described are not intended to be limiting but merely illustrative of the inventive method.

The unique and significant feature of the process used in the present invention is the surface leveling mechanism utilized to achieve the surface finish. A chemical solution is used in the vibratory bowl or tub in conjunction with ceramic media. When introduced into the machine, this chemical solution reacts with the metal and produces a stable, soft conversion coating across the asperities (peaks and valleys) of the gear teeth. The rubbing motion across the flanks of the gear teeth developed by the machine and media effectively rubs the conversion coating off the "peaks" of the surfaces, but leaves the "valleys" untouched. The conversion coating is continually re-formed and rubbed off during this stage producing a surface leveling mechanism. This mechanism is continued in the vibratory machine until the desired surface finish is attained. At this point, the active chemistry is turned off and is typically rinsed from the machine with a burnish solution, which does not react with the basis metal. During this stage, the conversion coating is rubbed off the gear teeth flanks one final time to produce the finished gears for the input planetary gear stage. And finally, since the process is water based, approximately room temperature and open atmosphere, there is no chance of tempering of the gear with chemically accelerated vibratory finishing. Thus, temper burn inspection is not required after superfinishing with the present invention.

Since the asperity peaks are removed prior to installation, no micro-stresses are introduced such as in the conventional run-in smoothing procedure. In fact, the need for run-in is greatly reduced or completely eliminated. Thus the problems of micropitting and fretting of the gear surfaces are reduced or eliminated. Also, the gears finished with the present invention generate no significant metal debris at start-up or after being in service for long periods, and thus avoids metal debris damaging the bearings. This also allows for longer time between lubrication servicing. Since the smoothing of the surfaces also reduces friction, the gears do not contribute to the typical break-in temperature spike responsible for a reduced life of the lubricant, bearings and seals. Noise and vibration can also be expected to be reduced for two reasons. Firstly, a reduction of friction will effect reduced vibration and noise. Secondly, a reduction in wear means that the transmission error will stay more constant with time, and therefore the noise also will not increase.

Prior to this invention, attempts to improve the durability of wind turbine power generator gearboxes was achieved by surface grinding the gear teeth followed by run-in, whereby the gearbox was operated under varying loads and speeds. Run-in can remove the peak asperities from some of the gear tooth mating surfaces, but also has a number of serious deficiencies as discussed above when compared to the present invention. Accordingly, several objects and advantages of the present invention over the teeth grinding and run-in process applicable to wind turbine power generators having an individual output power capacity of 500 kW and greater are:

1. to provide an improved input planetary stage having the entire teeth flanks superfinished, which reduces or eliminates damaging metal debris generated by the gears during run-in or during actual service;
2. to provide an improved planetary stage with significantly reduced or eliminated metal debris normally generated from the gear teeth, thereby reducing or eliminating an initiating source for bearing failure;
3. to provide a practical and cost-effective method of superfinishing the large hollow wheel gears, especially high geometrical accuracy through-hardened hollow wheels, using chemically accelerated vibratory finishing to a superior surface having a lower $R_a$, an increased $R_{mr}$, and a significant reduction of stress raisers;
4. to provide an improved input planetary stage since now some and preferably all of the gear flanks of any style gear 200 kg and larger can be superfinished to an $R_a$ of 0.25 micron or less while maintaining dimensional tolerances;
5. to provide an improved input planetary stage with significantly reduced micropitting and fretting, which can lead to future macropitting, wear and ultimately to failure of the teeth and bearings;
6. to provide a method which simultaneously superfinishes the drive and coast sides of all the gears and particularly the hollow wheel and sun gear teeth again reducing or eliminating the potential for harmful metal debris;
7. to provide an improved input planetary stage with a significantly reduced temperature spike which can be damaging to the metallurgy, lubricant and seals during the run in or early field operation;
8. to provide an improved input planetary stage with a significantly reduced vibration and/or noise caused by friction and/or tooth profile changes due to wear;
9. to provide an improved input planetary stage having gears with an increased material ratio ($R_{mr}$) on the contact teeth surfaces allowing for a greater power density;
10. to provide an improved input planetary stage allowing streamlining or elimination of the run-in process;
11. to provide a process that does not require temper burn inspection after the gears are superfinished;
12. to provide a chemically accelerated vibratory finishing process applicable to all style gears of 200 kg and greater in all types of gear boxes that operate in a boundary lubrication regimes such that superfinishing reduces or eliminates lubricant debris; and
13. to provide an improved large gearbox where some, or preferably, all the gears and/or bearings are superfinished to reduce or eliminate lubricant debris.

Further objects and advantages will become apparent from a consideration of the ensuing description and drawings.

DETAILED DESCRIPTION OF THE INVENTION

Figure 1:
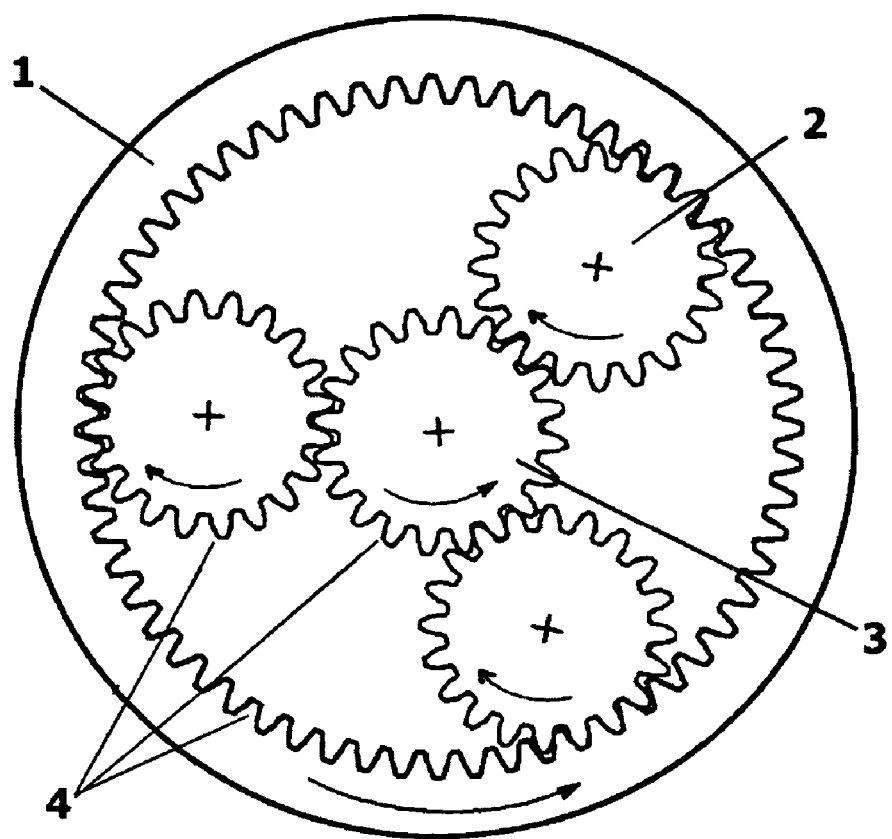
FIG. 1 is a drawing of the cross section of a planetary gearbox with three planet gears.
Figure 2A:
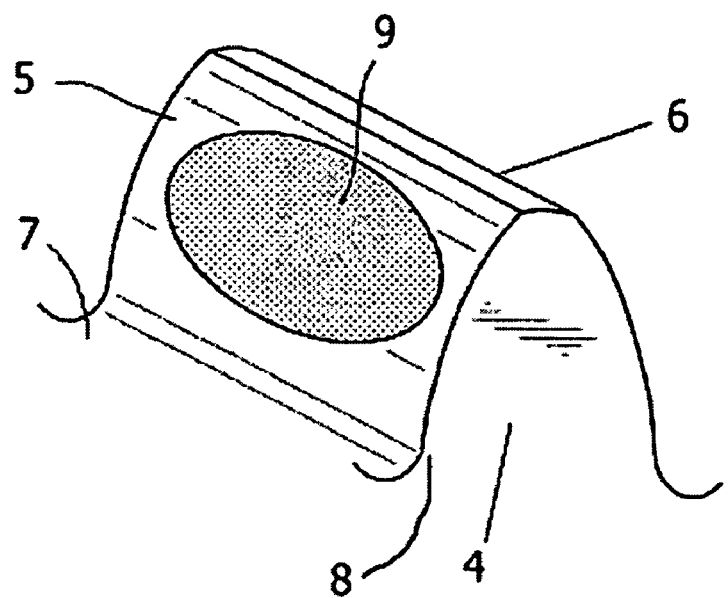
FIG. 2a is a drawing of a gear tooth illustrating the tooth contact area.
Figure 2B:
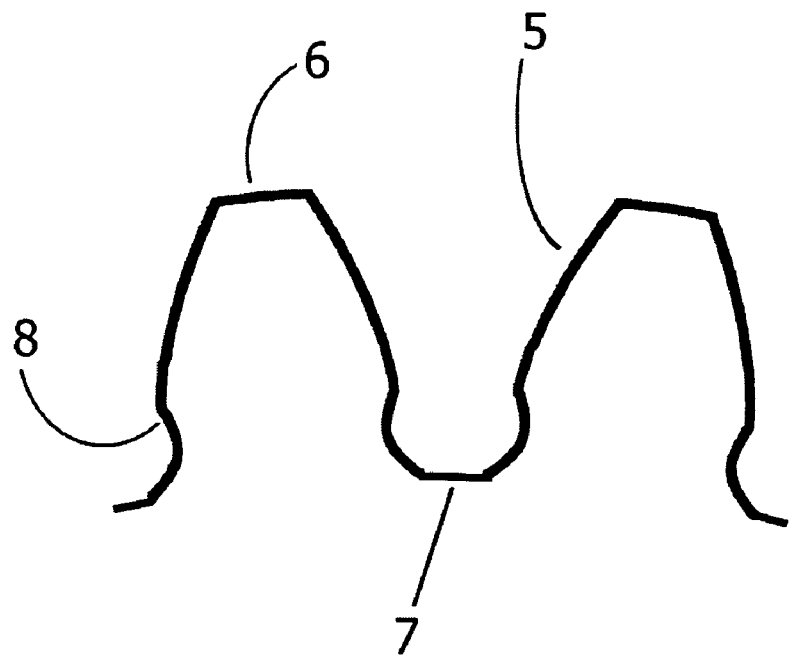
FIG. 2b is a drawing of the cross section of two gear teeth.

FIG. 1 is a drawing of an input planetary stage typically used in wind turbine gearboxes. It consists of a hollow wheel gear (1), two or more planet gears (2), and a sun gear (3). The teeth (4) of each gear are to be superfinished. FIG. 2a is a 3-dimensional view of a single gear tooth (4) and FIG. 2b shows a 2-dimensional cross section of two gear teeth (4). The gear tooth (4) consists of the flank (5), which is the working or contacting side of the gear tooth, the top land (6), which is the top surface of the gear tooth, the bottom land (7), which is the surface at the bottom of the space between adjacent teeth, and the root fillet (8), which is the rounded portion at the base of the gear tooth between the tooth flank (5) and the bottom land (7). The most critical area is the tooth contact pattern (9), which is the surface area of a gear tooth which has been in contact with its mate when the gears are in operation. In the present invention, one or more of the planetary gears of a wind turbine gearbox including the sun (3), the planets (2) and the hollow wheel gear (1) are superfinished on their drive and coast sides using chemically accelerated finishing in a vibratory bowl or tub to an $R_a$ of 0.25 micron or less.

General Description of Superfinishing Process

A general description of the superfinishing process follow with commonly owned U.S. Pat. Nos. 4,491,500 and 4,818,333, and U.S. patent application Ser. Nos. 10/071,533, 09/758,067, and 10/684,073, each of which is incorporated herein by reference. An active chemistry is introduced into the vibratory finishing apparatus that is capable of converting the metal of the gear to a composition of a reduced hardness film that is physically and chemically stable and may or may not be visually perceptible. This film is known as a conversion coating. When this film is developed on the surface of the gear, the action of the media elements upon the gear will only remove the film from the asperity peaks of the gear, leaving the depressed areas of the coating intact. By constantly wetting the metal surface with the active chemistry, the stable coating will continuously re-form, covering those areas where the bare underlying metal has been freshly exposed, to provide a new layer of the relatively soft film. If that portion remains higher than the adjacent areas it will continue to be rubbed away until any roughness has been virtually eliminated.

The amount of active chemistry solution utilized will be only that which will maintain all surfaces of the treated parts in a wetted condition, so as to ensure continuous and virtually instantaneous reformation of any coating removed through the rubbing action. As will be evident to those skilled-in-the-art, the amount of any media utilized will depend upon numerous factors, such as the surface character, area, weight and composition of the gears being treated, the composition of the solution utilized for the conversion coating, temperatures of operation, the degree and rate of refinement to be achieved, etc.

Although the properties exhibited by the conversion coating produced on the gear are of crucial importance to the successful practice of the present process, the formulation of the active chemistry utilized to produce the coating is not. The composition must be capable of quickly and effectively producing, under the conditions of operation, relatively soft reaction products of the basis metal and the coating must be substantially insoluble in the liquid medium so as to ensure that removal occurs primarily by rubbing, rather than by dissolution. The active chemistry will generally consist of water and up to about 40 weight percent of active ingredients, comprised essentially the conversion chemicals but also optionally and desirably including an oxidizing agent, and in some instances a stabilizer and/or a wetting agent. After the desired amount of refinement is attained, the active chemistry is shut off. Thereafter, a burnishing solution may be introduced into the vibratory machine. The burnishing solution, which is non-reactive to the basis metal, serves to remove the conversion coating from the surface to create a specular appearance.

Superfinishing the Planets and Sun Gears

In one embodiment of the present invention, the sun gear and planet gears can be superfinished in a suitably sized vibratory bowl or tub machines. Multiple gears with suitable mounting can be superfinished simultaneously. A device may be used to support the gear(s) or to keep the gear(s) from contacting the sides of the vibratory bowl or tub while in operation. The gear(s) are rapidly agitated to produce relative movement among the gear(s) and the non-abrasive ceramic media. The surfaces of the gear(s) and the media are maintained in a wetted condition with an aqueous solution of FERROMIL® FML-590 at 30 v/v %. The non-abrasive solid media elements are of an amount, size and shape such that, under the conditions of agitation, produce uniform media rubbing of the gear teeth. The process is continued until the arithmetic average roughness ($R_a$) value is 0.25 micron or less. The gear(s) are then burnished to remove the conversion coating using an aqueous solution of 1.5 v/v % of FERROMIL® FBC-295 to a specular appearance.

While the preferred embodiment contemplates the use of non-abrasive ceramic media, other ceramic media, plastic media, steel media, stainless steel media and combinations of different types of media, can also be used, depending upon the physical circumstances surrounding the finishing of the gear. It is within the skill of one in the art to determine which media, or combination of media, to use in each instance.

Superfinishing the Hollow Wheel Gear

Figure 3:
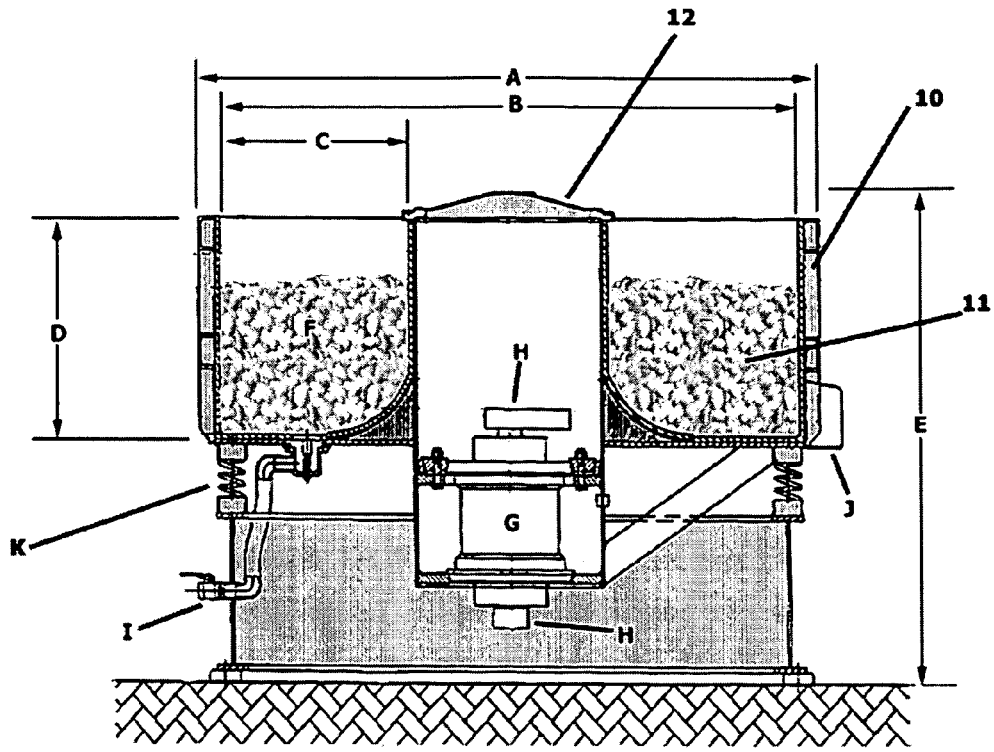
FIG. 3 is a drawing of the vibratory bowl containing media used to superfinish the hollow wheel gear.

This example teaches one embodiment for superfinishing a large hollow wheel gear (1) suitable for commercial wind turbine gearboxes of output power capacity of 500 kW and greater. The hollow wheel gear (1) has the following approximate weight and dimensions. It weighs 1,620 kg, has an outer diameter of 171 cm, an inner diameter of 146 cm, and a face width of 38.5 cm. The hollow wheel can be heat treated via gas carburization, gas nitriding, or it can be through hardening. In FIG. 3, a vibratory bowl (10) is filled to approximately two-thirds of its volume with a mixture of abrasive and non-abrasive ceramic media (11). The media size and shapes are selected such that a homogenous mixture of media has uniform contact across the gear tooth flank. The amount of media is also chosen to give the preferred amount of lifting action during processing such that the gear does not contact the bottom or sides of the vibratory bowl channel, or such that the top of the gear does not climb above the working media level. The motor weights are set to a lead angle of approximately 85 degrees.

Figure 5:
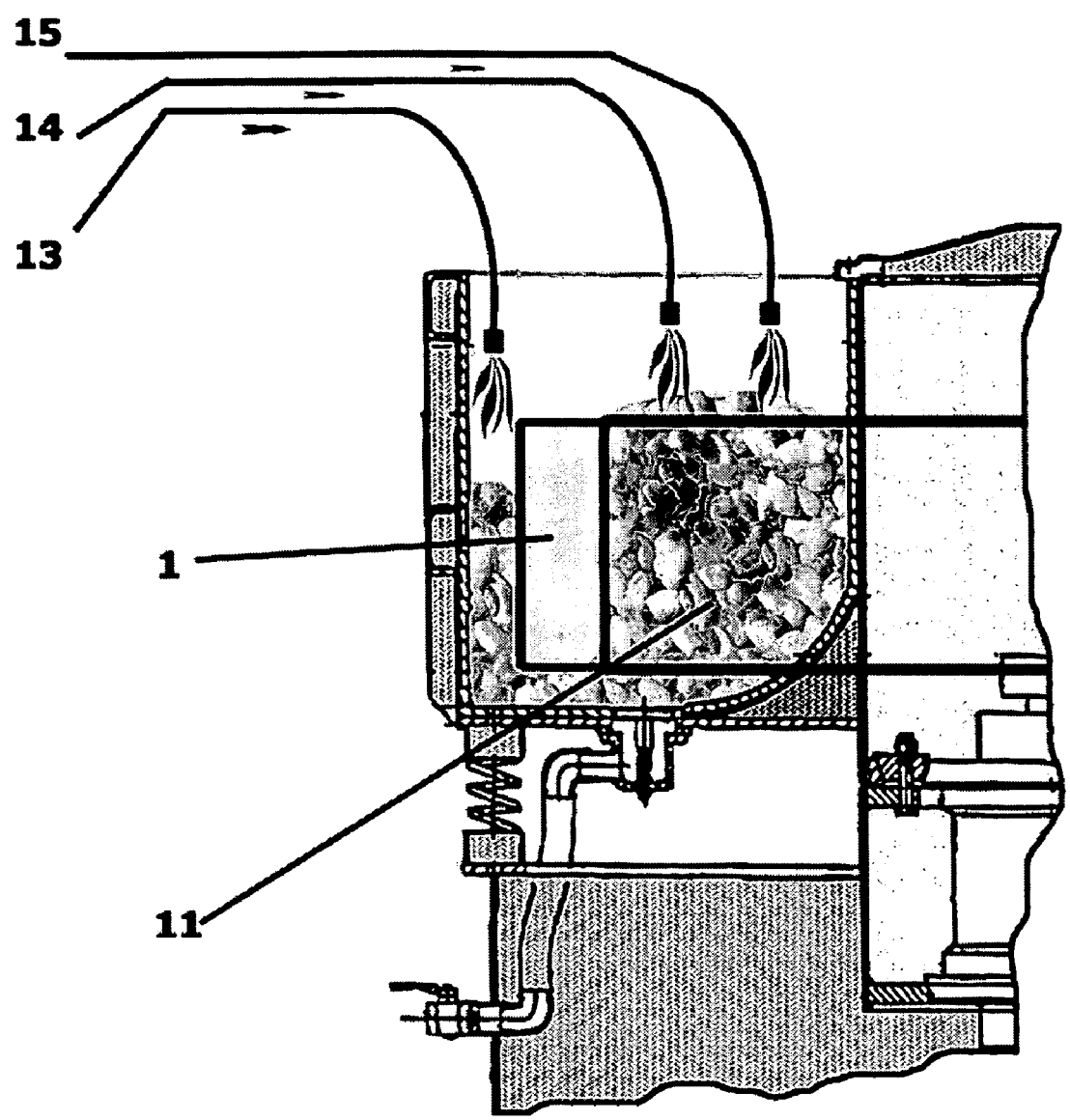
FIG. 5 is a drawing illustrating the location at which the chemical solutions are delivered during the superfinishing process.

The hollow wheel gear (1) is laid horizontally over the center hub (12) of the vibratory bowl (10) onto the stationary media mass (11) taking reasonable care to center the hollow wheel gear relative to the center of the bowl. As illustrated in FIG. 5 an aqueous solution of FERROMIL® FBC-295 at 1.5 v/v % with a flow rate of 20 L/hr is delivered into the region between the outside wall of the bowl and the outer surface of the gear (13) to reduce the effects of frictional heat generation. An aqueous solution of active chemistry consisting of FERROMIL® FML-590 at 30 v/v % is delivered at 18 L/hr into the region between the center hub (12) and the internal gear teeth (14).

Figure 4:
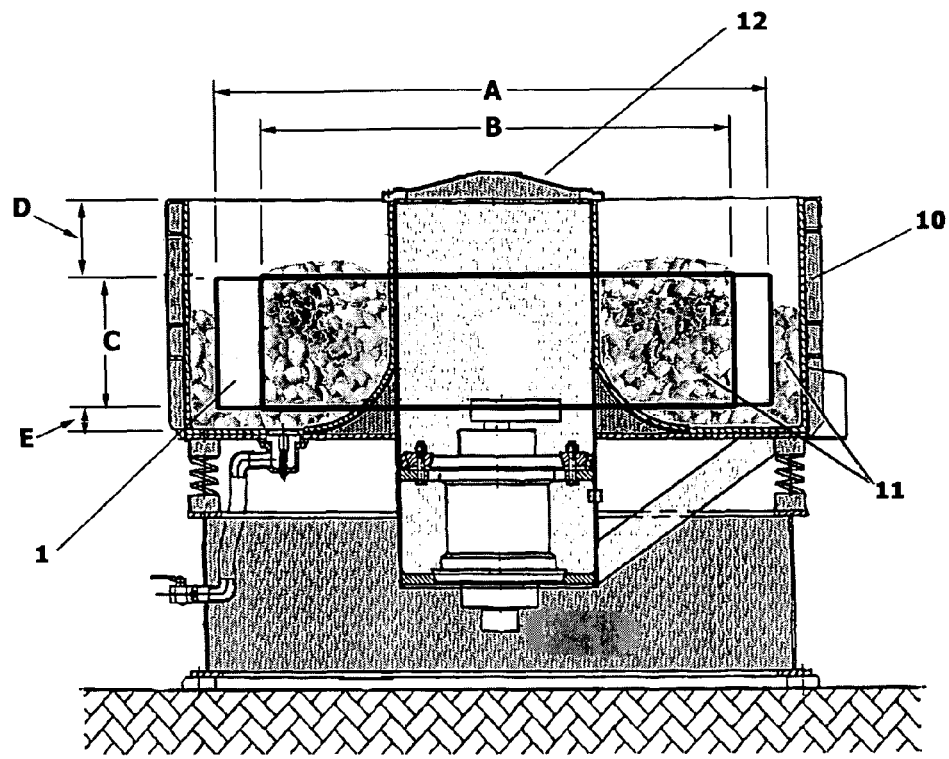
FIG. 4 is a drawing of the vibratory bowl illustrating the ideal position for the hollow wheel gear during the superfinishing process.

The vibratory bowl (10) is started at a low frequency and is gradually increased to approximately 46 to 48 hertz whereby the hollow wheel gear settles into the media (11). The ideal position is shown in FIG. 4 where the uppermost part of the gear (1) is at or just below the media (11) and air interface. If the vibratory bowl amplitude is not between 1.5 to 2.0 mm, adjustments should be made to the lower weight to attain this amplitude. This measurement is read from an amplitude gauge mounted on the outside of the bowl (10). The hollow wheel gear (1) will remain centered during the remainder of the processing and will slowly rotate around the center hub of the vibratory bowl. (12).

The following parameters may be adjusted as needed in order to keep the gear (1) at or just below the upper surface of the media (11) so that it rotates uniformly around the center hub (12) of the vibratory bowl (10):

Media size, shape, composition and percentage of each.
Media level.
Frequency of the motor.
Amplitude and lead angle generated by the adjustable weight system.
Concentrations and flow rates of active chemistry and burnish solutions.

The adjustment of these parameters is within the knowledge of one of ordinary skill of the art.

The process is continued until the arithmetic average roughness ($R_a$) value of 0.25 micron or less. The flow of active chemistry is shut off, and a burnishing compound consisting of an aqueous solution of FERROMIL® FBC-295 at 1.5 v/v % is delivered at 150 L/hr into the region between the center column of the bowl and the teeth of the gear (15). The process is continued until the conversion coating is removed producing a clean and bright appearance.

Figure 6:
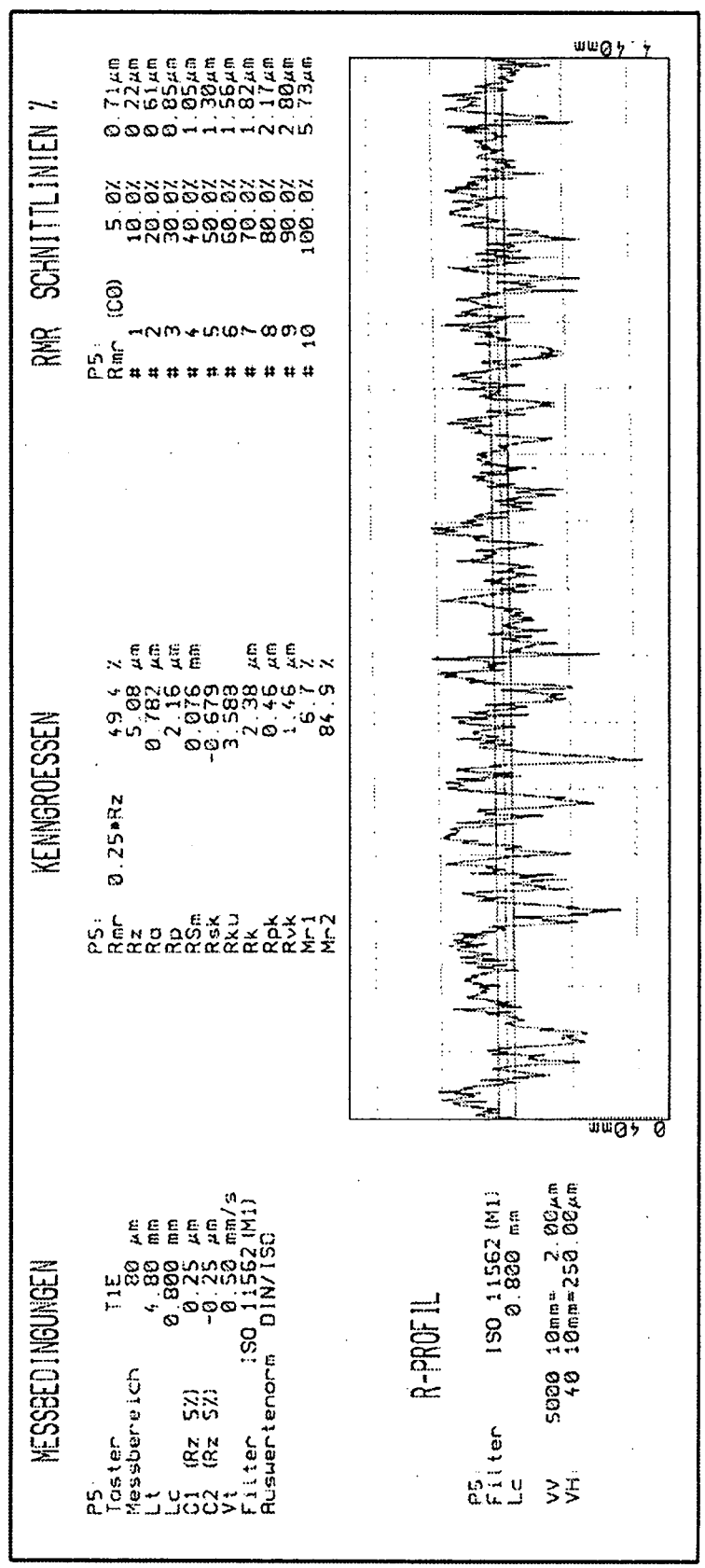
FIG. 6 are the surface parameters and profile measured on a typical machined/ground flank of a hollow wheel gear tooth.
Figure 7:
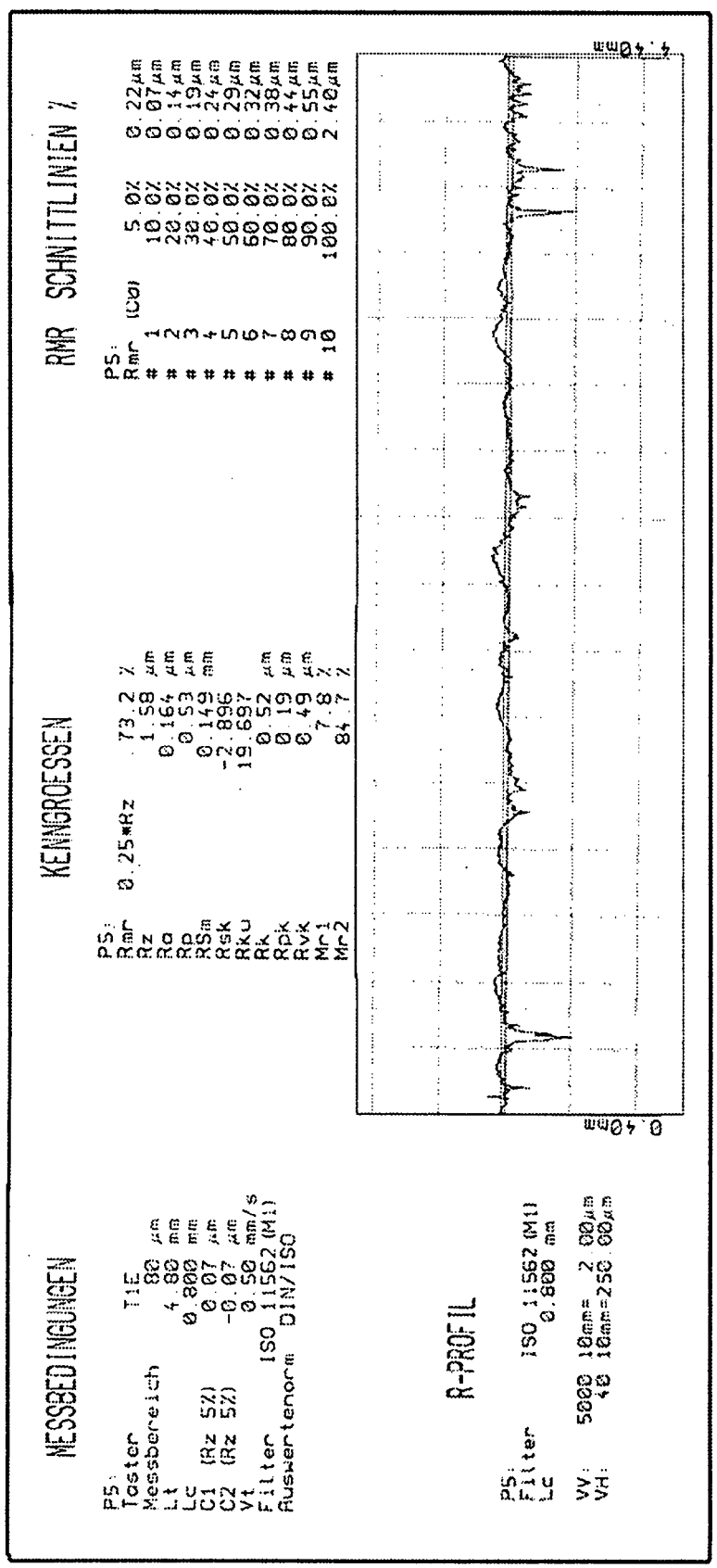
FIG. 7 are the surface parameters and profile measured on a typical superfinished flank of a hollow wheel gear tooth using the present invention.

The unanticipated results that were obtained were:

1. The gear remains centered in the bowl, and is suspended off the bottom of the bowl by the motion of the media, and the uppermost part of the gear remains at or just below the media/air interface.
2. The gear is superfinished with no damage from the media or media shards.
3. An $R_a$ 0.25 micron or less is achieved, and the material ratio is significantly increased.
    a. FIG. 6 shows a typical surface roughness profile of the gear teeth contact area prior to superfinishing. The $R_a$ is 0.78 micron, and the $R_{mr}$ is 49.4%.
    b. FIG. 7 shows the surface roughness profile of the gear teeth contact area after superfinishing. The $R_a$ is 0.16 micron, and the $R_{mr}$ is 73.2%
4. The surface finish is uniform, within tolerances, across the lead and profile.
5. Only an insignificant amount, if any, of media is fractured by the process (i.e., the media attrition was extremely low).

Planetary Testing in the Field

Two wind turbine generator gearboxes having an output power capacity of greater than 500 kW had all of the gears from the input planetary stage superfinished to a surface roughness of 0.25 micron or less using the process described in the present invention. Prior to superfinishing, the hollow wheels were through-hardened, and the planets and sun gears were gas carburized. After being placed in service, the gearboxes were inspected after approximately 6 months and after approximately one year of operation. No micropitting or fretting was observed on the gear teeth surfaces. Similarly, no bearing damage was found. In comparison, ground gears smoothed only by the run-in technique commonly can start to show signs of micropitting or fretting after only 6 months of operation, and bearings begin to show damage via direct inspection or by noise/vibration monitoring. Further anticipated advantages of the present invention include reduced metal debris, improved bearing life, reduced wear, reduced vibration and noise, improved contact fatigue resistance, improved lubrication, increased time between lubricant servicing, a simplified or eliminated run-in process, and enhanced durability, efficiency, and reduced manufacturing and operating cost of the planetary gearbox.

While the apparatuses and methods of the present invention have been described in terms of preferred embodiments, it will be apparent to those of skill in the art that variations may be applied to what has been described herein without departing from the concept and scope of the invention. All such similar substitutes and modifications apparent to those skilled in the art are deemed to be within the scope and concept of the invention, in particular the applicability of this process to finishing any type gear, any type of large planetary gear system, not just those involved in the wind turbine industry and any type of large gear box having individual gears greater than 200 kg that operate in boundary lubrication regimes. Such examples of other industries in which this technology will be useful is in the marine propulsion and earth moving industries, the mining industries, as well as any other industry employing the use of large gear systems.

What is claimed is:

1. A gearbox operating under high and varying loads at low pitch line velocities, comprising:
    a plurality of gears operating under high and varying loads at low pitch line velocities;
    wherein at least the tooth contact areas of at least two of the plurality of gears are substantially finished to a surface roughness Ra less than 0.25 μm using an isotropic superfinishing process;
    wherein substantially full elasto-hydrodynamic lubrication occurs between the superfinished tooth contact areas.

2. The gearbox of claim 1, wherein at least the tooth contact areas of at least two of the plurality of gears are substantially superfinished to a surface roughness Ra less than 0.15 μm using an isotropic superfinishing process.

3. The gearbox of claim 1, wherein at least the tooth contact areas of the plurality of gears are substantially superfinished to a surface roughness Ra less than 0.25 μm using an isotropic superfinishing process.

4. The gearbox of claim 1, wherein at least the tooth contact areas of the plurality of gears are substantially superfinished to a surface roughness Ra less than 0.15 μm using an isotropic superfinishing process.

5. The gearbox of claim 1, wherein substantially full elasto-hydrodynamic lubrication occurs between the superfinished tooth contact areas during a substantial portion of normal operation.

6. The gearbox of claim 1, wherein the superfinished tooth contact areas are substantially superfinished in a vibratory vessel containing a plurality of media.

7. The gearbox of claim 1, wherein the superfinished tooth contact areas are substantially superfinished using a chemically accelerated isotropic superfinishing process.

8. The gearbox of claim 1, wherein at least one of the superfinished gears are heat treated by a method selected from the group consisting of gas carburization, gas nitriding, and through-hardening.

9. A planetary gear stage operating under high and varying loads at low pitch line velocities, comprising:
    a plurality of gears operating under high and varying loads at low pitch line velocities comprising a hollow wheel gear, a plurality of planet gears, and a sun gear;
    wherein at least the tooth contact areas of at least two of the plurality of gears are substantially finished to a surface roughness Ra less than 0.25 μm using an isotropic superfinishing process;
    wherein substantially full elasto-hydrodynamic lubrication occurs between the superfinished tooth contact areas.

10. The planetary gear stage of claim 9, wherein at least the tooth contact areas of at least two of the plurality of gears are substantially superfinished to a surface roughness Ra less than 0.15 μm using an isotropic superfinishing process.

11. The planetary gear stage of claim 9, wherein at least the tooth contact areas of the hollow wheel gear and at least one of the planet gears are substantially superfinished to a surface roughness Ra less than 0.25 μm an using an isotropic superfinishing process.

12. The planetary gear stage of claim 9, wherein at least the tooth contact areas of the hollow wheel gear and at least one of the planet gears are substantially superfinished to a surface roughness Ra less than 0.15 μm using an isotropic superfinishing process.

13. The planetary gear stage of claim 9, wherein substantially full elasto-hydrodynamic lubrication occurs between the superfinished tooth contact areas during substantial portion of a normal operation.

14. The planetary gear stage of claim 9, wherein the superfinished tooth contact areas are substantially superfinished in a vibratory vessel containing a plurality of media.

15. The planetary gear stage of claim 9, wherein the superfinished tooth contact areas are substantially superfinished using a chemically accelerated isotropic superfinishing process.

16. The planetary gear stage of claim 9, wherein at least one of the superfinished gears are heat treated by a method selected from the group consisting of gas carburization, gas nitriding, and through-hardening.

17. A wind turbine comprising:
    a planetary gear stage operating under high and varying loads at low pitch line velocities, the planetary gearbox comprising a plurality of gears comprising a hollow wheel gear, a plurality of planet gears, and a sun gear;
    wherein at least the tooth contact areas of at least two of the plurality of gears are substantially finished to a surface roughness Ra less than 0.25 μm using an isotropic superfinishing process;
    wherein substantially full elasto-hydrodynamic lubrication occurs between the superfinished tooth contact areas.

18. The wind turbine of claim 17, wherein at least the tooth contact areas of at least two of the plurality of gears are substantially superfinished to a surface roughness Ra less than 0.15 μm using an isotropic superfinishing process.

19. The wind turbine of claim 17, wherein at least the tooth contact areas of the hollow wheel gear and at least one of the planet gears are substantially superfinished to a surface roughness Ra less than 0.25 μm using an isotropic superfinishing process.

20. The wind turbine of claim 17, wherein at least the tooth contact areas of the hollow wheel gear and at least one of the planet gears are substantially superfinished to a surface roughness Ra less than 0.15 μm using an isotropic superfinishing process.

21. The wind turbine of claim 17, wherein substantially full elasto-hydrodynamic lubrication occurs between the superfinished tooth contact areas during a substantial portion of normal operation.

22. The wind turbine of claim 17, wherein the superfinished tooth contact areas are substantially superfinished in a vibratory vessel containing a plurality of media.

23. The wind turbine of claim 17, wherein the superfinished tooth contact areas are substantially superfinished using a chemically accelerated isotropic superfinishing process.

24. The wind turbine of claim 17, wherein at least one of the superfinished gears are heat treated by a method selected from the group consisting of gas carburization, gas nitriding, and through-hardening.

25. A planetary gear stage operating under high and varying loads at low pitch line velocities, comprising:
   a plurality of gears operating under high and varying loads at low pitch line velocities comprising a hollow wheel gear, a plurality of planet gears, and a sun gear; and
   means for reducing lubricant debris buildup from the planetary gear stage.

26. A planetary gear stage operating under high and varying loads at low pitch line velocities, comprising:
   a plurality of gears operating under high and varying loads at low pitch line velocities comprising a hollow wheel gear, a plurality of planet gears, and a sun gear; and
   means for eliminating the run-in process for the planetary gear stage.

27. A planetary gear stage operating under high and varying loads at low pitch line velocities, comprising:
   a plurality of gears operating under high and varying loads at low pitch line velocities comprising a hollow wheel gear, a plurality of planet gears, and a sun gear; and
   means for reducing micropitting of the planetary gear stage.

28. A planetary gear stage operating under high and varying loads at low pitch line velocities, comprising:
   a plurality of gears operating under high and varying loads at low pitch line velocities comprising a hollow wheel gear, a plurality of planet gears, and a sun gear; and
   means for reducing vibration and noise from the planetary gear stage.

* * * * *